US010372483B2

(12) United States Patent
Beiter et al.

(10) Patent No.: US 10,372,483 B2
(45) Date of Patent: Aug. 6, 2019

(54) MAPPING TENAT GROUPS TO IDENTITY MANAGEMENT CLASSES

(71) Applicant: Hewlett-Packard Development Company, L.P., Houston, TX (US)

(72) Inventors: Michael B Beiter, Fort Collins, CO (US); Randall E Grohs, Star, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 193 days.

(21) Appl. No.: 15/112,371

(22) PCT Filed: Jan. 20, 2014

(86) PCT No.: PCT/US2014/012174
§ 371 (c)(1),
(2) Date: Jul. 18, 2016

(87) PCT Pub. No.: WO2015/108536
PCT Pub. Date: Jul. 23, 2015

(65) Prior Publication Data
US 2016/0335118 A1 Nov. 17, 2016

(51) Int. Cl.
*G06F 17/30* (2006.01)
*G06F 7/04* (2006.01)
(Continued)

(52) U.S. Cl.
CPC .................. *G06F 9/468* (2013.01)

(58) Field of Classification Search
CPC ........................................... G06F 9/468
See application file for complete search history.

(56) References Cited

U.S. PATENT DOCUMENTS 6,397,125 B1   5/2002  Goldring et al.
7,571,473 B1 * 8/2009  Boydstun ................ G06F 21/41
726/21

(Continued)

FOREIGN PATENT DOCUMENTS

JP            6141076 B2 *  6/2017 ........... H04L 63/104
WO   WO-2003098483 A1   11/2003

OTHER PUBLICATIONS

Gigya, "Accounts API—Gigya's Documentation," (Webpage), retrieved on Dec. 18, 2013, 7 pages.
(Continued)

*Primary Examiner* — John B King
*Assistant Examiner* — Darshan I Dhruv
(74) *Attorney, Agent, or Firm* — Trop Pruner & Hu, PC

(57) ABSTRACT

Groups of a plurality of tenants are mapped to identity management classes corresponding to respective roles that grant respective permissions. The identity management classes are associated with hierarchical delegation information that specify delegation rights among the identity management classes, the delegation rights specifying rights of members of the respective identity management classes to perform delegation with respect to further members of the identity management classes. In response to a request by a first member of a first of the identity management classes to perform delegation with respect to a second member of one of the identity management classes, it is determined, based on the hierarchical delegation information, whether the first member is allowed to perform the delegation with respect to the second member.

15 Claims, 7 Drawing Sheets

(51) Int. Cl.
*G06F 15/16* (2006.01)
*H04L 29/06* (2006.01)
*G06F 9/46* (2006.01)

(56) References Cited

U.S. PATENT DOCUMENTS

| | | | |
|---|---|---|---|
| 7,630,974 B2 | 12/2009 | Remahl et al. | |
| 7,970,791 B2 | 6/2011 | Liao et al. | |
| 7,996,883 B2 | 8/2011 | Chin et al. | |
| 8,132,231 B2* | 3/2012 | Amies | H04L 67/02 726/1 |
| 8,434,129 B2 | 4/2013 | Kannappan et al. | |
| 8,447,829 B1* | 5/2013 | Geller | G06F 9/468 709/217 |
| 8,555,055 B2* | 10/2013 | Grebenik | G06F 21/604 713/155 |
| 8,869,244 B1* | 10/2014 | Sundaram | G06F 21/6218 726/4 |
| 2004/0083367 A1* | 4/2004 | Garg | G06F 21/602 713/170 |
| 2004/0243822 A1 | 12/2004 | Buchholz et al. | |
| 2007/0079369 A1* | 4/2007 | Grinstein | G06F 21/31 726/19 |
| 2008/0189617 A1 | 8/2008 | Covell et al. | |
| 2009/0076865 A1* | 3/2009 | Rousselle | G06Q 10/00 705/7.36 |
| 2010/0306393 A1* | 12/2010 | Appiah | G06Q 10/10 709/229 |
| 2010/0306775 A1* | 12/2010 | Appiah | G06F 9/468 718/100 |
| 2010/0306817 A1* | 12/2010 | Grebenik | G06F 21/604 726/1 |
| 2010/0325684 A1* | 12/2010 | Grebenik | G06F 21/604 726/1 |
| 2011/0126275 A1 | 5/2011 | Anderson et al. | |
| 2011/0225167 A1 | 9/2011 | Bhattacharjee et al. | |
| 2011/0231899 A1 | 9/2011 | Pulier et al. | |
| 2011/0314520 A1* | 12/2011 | Olszewski | G06F 9/468 726/4 |
| 2012/0136936 A1 | 5/2012 | Quintuna | |
| 2012/0143951 A1 | 6/2012 | Hacigumus et al. | |
| 2012/0150912 A1* | 6/2012 | Ripberger | G06F 21/80 707/786 |
| 2012/0151568 A1 | 6/2012 | Pieczul et al. | |
| 2012/0173725 A1 | 7/2012 | Verma | |
| 2012/0179646 A1 | 7/2012 | Hinton et al. | |
| 2012/0191760 A1 | 7/2012 | Kaufman et al. | |
| 2012/0233522 A1 | 9/2012 | Barton et al. | |
| 2013/0019276 A1 | 1/2013 | Biazetti et al. | |
| 2013/0041872 A1 | 2/2013 | Aizman et al. | |
| 2013/0060839 A1 | 3/2013 | Van Biljon et al. | |
| 2013/0061306 A1* | 3/2013 | Sinn | H04L 67/10 726/7 |
| 2013/0091171 A1 | 4/2013 | Lee | |
| 2013/0139172 A1 | 5/2013 | An et al. | |
| 2013/0144945 A1 | 6/2013 | Said et al. | |
| 2013/0185431 A1 | 7/2013 | Venkatesh et al. | |
| 2013/0185436 A1 | 7/2013 | Carlin et al. | |
| 2013/0227560 A1 | 8/2013 | McGrath et al. | |
| 2013/0227658 A1 | 8/2013 | Leicher et al. | |
| 2013/0254397 A1* | 9/2013 | Lai | H04L 51/32 709/225 |
| 2013/0254539 A1 | 9/2013 | Auradkar et al. | |
| 2013/0275379 A1 | 10/2013 | Trebas et al. | |
| 2014/0075501 A1* | 3/2014 | Srinivasan | G06F 21/62 726/1 |
| 2014/0075565 A1* | 3/2014 | Srinivasan | G06Q 10/06315 726/26 |
| 2014/0181992 A1* | 6/2014 | Janson | G06F 21/60 726/27 |
| 2014/0279880 A1* | 9/2014 | Mills | G06F 16/273 707/613 |
| 2014/0280345 A1* | 9/2014 | Cras | G06F 21/62 707/781 |
| 2014/0304837 A1* | 10/2014 | Mogaki | G06F 21/33 726/28 |

OTHER PUBLICATIONS

Gigya, "Identity Storage—Gigya's Documentation," (Webpage) retrieved or Dec. 18, 2013, 5 pages.
Gigya, "Identity Storage," (Webpage), retrieved on Dec. 18, 2013, 3 pages.
Gigya, User Management 360, Gigya's Documentation retrieved on Dec. 18, 2013, 3 pages.
Hitachi ID Systems Inc., "Privileged Access Manager Product Q&A," (Web Page), Dec. 14, 2011, 10 pages ~ http://hitachi-id.com/.
IBM, "IBM Lotus Domino 8.5 Administrator Versions 8.5 and 8.5.1, How replication works in a cluster" (Web Page), Oct. 5, 2009, 2 pages ~ http://publib.boulder.ibm.com/.
Identropy, "Smart Identity Management," (Web Page), Jan. 9, 2013, 2 pages, avaliable at http://www.identropy.com/smart-idm/.
Netiq, "Lightning-fast administration for greater agility," (Web Page), Oct. 15, 2010, 2 pages ~ https://www.netiq.com/.
Oracle, "Data Replication," Oracle Solaris Cluster Geographic Edition Overview, Solaris Cluster 4.0, 2012, 2 pages ~ http://docs.oracle.com/.
Sample, N. et al, "Indexing Open Schemas," (Research Paper), Jun. 15, 2002, 13 pages ~ http://infolab.stanford.edu/.
Shi, K. et al., "Zone-Based Replication Scheme for Mobile Ad Hoc Networks Using Cross-Layer Design," (Web Page), 2006, pp. 698-710 ~ http://link.springer.com.
VCE Corporation, "VBLOCK™ Solution for Trusted Multi-Tenancy: Design Guide," (Research Paper), Mar. 20, 2013, 143 pages ~ http://www.vce.com/.

* cited by examiner

MAPPING TENAT GROUPS TO IDENTITY MANAGEMENT CLASSES

BACKGROUND

A cloud system includes resources or services that can be shared by customers of a provider of the cloud system. Resources can include processing resources, storage resources, communication resources, and so forth. Services can be provided by applications or other machine-executable instructions. The cloud system allows its resources or services to be accessed by customers on-demand.

BRIEF DESCRIPTION OF THE DRAWINGS

Some implementations are described with respect to the following figures.

DETAILED DESCRIPTION

Figure 1:
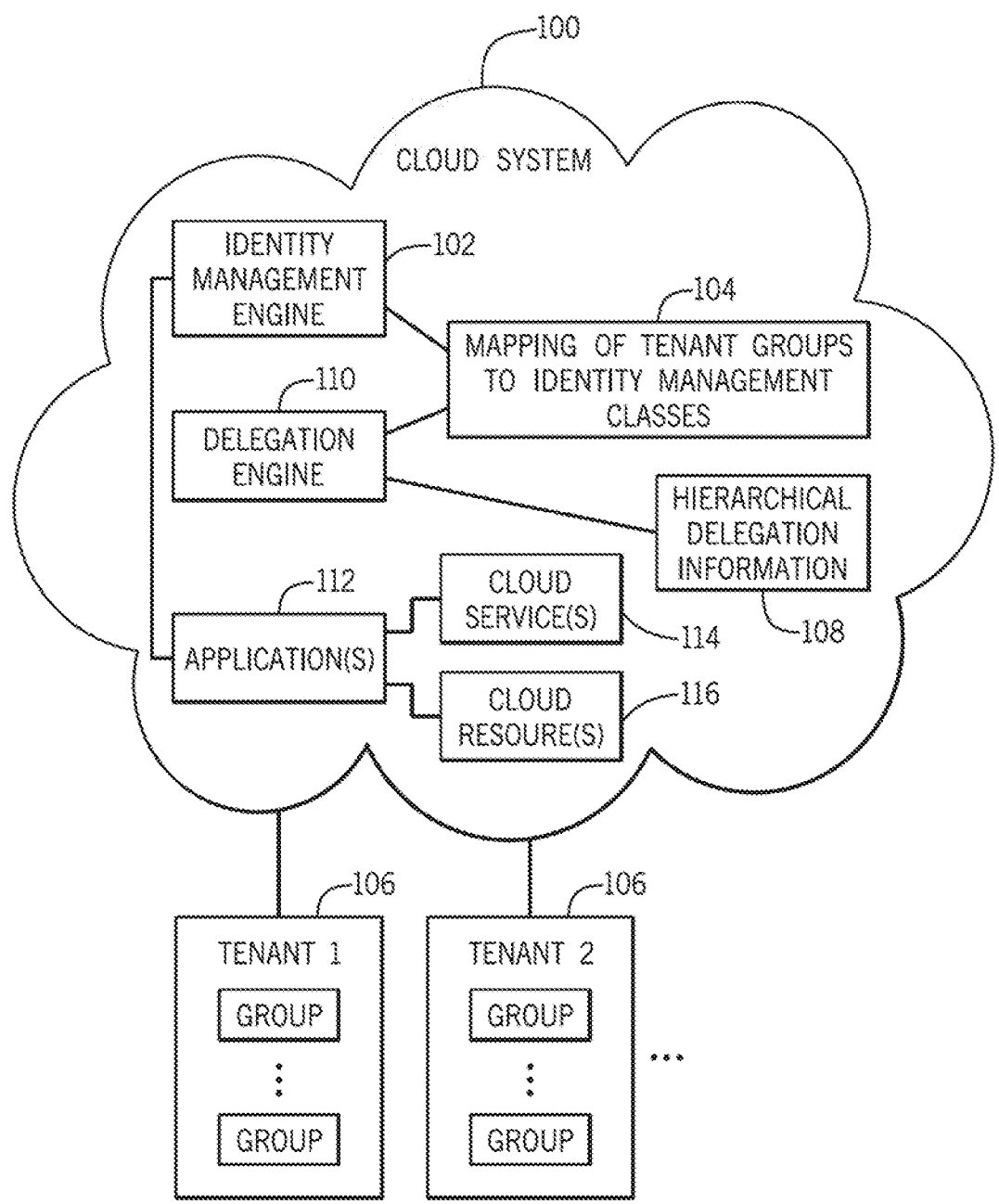
FIG. 1 is a block diagram of an example cloud arrangement including a cloud system and tenants that are able to access the resources or services of the cloud system, in accordance with some implementations.

The infrastructure of a cloud system can be owned by or managed by a provider, which can be an entity such as a business concern, government agency, educational organization, or individual. The infrastructure of the cloud system can be located at a particular geographic site, or can be distributed across multiple geographic sites. The infrastructure includes cloud resources and cloud services that are made available to customers of the cloud system provider. Such customers, which are also referred to as tenants, can be located anywhere, so long as they are able to access the cloud system over a network. A tenant can refer to any collection of users, such as users who are members of a business concern, a government agency, or an educational organization.

Cloud resources can include any one or some combination of the following: processing resources (which can include processors of one or multiple computers), storage resources (which can include storage devices such as disk-based storage devices or solid state storage devices), communication resources (which can include communication devices to allow communications by users, where examples of communication devices can include routers, switches, communication establishment servers, etc.), and other resources.

In addition to cloud resources, the cloud system can also provide cloud services, such as web services, that can be invoked by users of tenants of the cloud system. A user of a tenant can refer to a machine or a human. A cloud service refers to a functionality that can be invoked by a tenant. The functionality can be provided by machine-readable instructions. A web service refers to a service that is accessible over a network, such as the Internet.

Although reference is made to a cloud system in the present discussion, it is noted that techniques or mechanisms according to some implementations are also applicable to other types of systems that can include resources an for services that can be shared by multiple tenants.

A cloud system can include an identity management system that stores information to enable authentication of users attempting to access the cloud system, and authorization of access to requested resources or services of the cloud system. Other entities can interact with the identity management system to perform the authorization and authentication. The identity management system can define privileges relating to the access of the resources and services of the cloud system. A privilege can refer to the permission of a given user to perform a task with respect to the cloud system (or more specifically, with respect to an application in the cloud system), which can involve accessing a resource or service of the cloud system. An application can refer to machine-readable instructions executable in the cloud system for managing access to a cloud resource and/or providing a cloud service.

The identity management system also provides privileges associated with the ability to create, read, update, or delete profile information of users. The profile information of a user maintained by the identity management system can include various types of user data, including a user's name, email address, login name (for logging into the cloud system), one or multiple authentication credentials that allow a user to access the cloud system (examples of an authentication credential can include a password, biometric information of the user, a secure key, and so forth), and so forth. The profile information of a user can include a public portion (which is known to other users) and a private portion (which is known only to the user and possibly an administrator). For example, the public portion of the profile information can include the name of the user that is publically displayed, the user's email address, and so forth. Examples of the private information of the user can include a login name, authentication credential, and so forth.

A "multi-tenant" identity management system is an identity management system that is able to perform identity management for multiple tenants, such as multiple tenants of a cloud system.

In addition to the identity management system of the cloud system, a tenant can also be associated with an identity management system. The users of a tenant can be divided into multiple groups. A group can refer to a set of users that can be identified by a unique name. Groups can be used for various purposes. For example, the groups can be part of an organizational structure, which can correspond to departments or other organizational units of the tenant. Examples of departments can include an engineering department, a sales department, a finance department, an executive management department, and so forth. Groups can also be used in distribution lists for performing communications among users of the tenant. For example, the distribution lists can include email distribution lists, which can allow a user to send an email to all members of a specific department or organizational unit.

The identity management system of a tenant can perform authorization based on the groups of the tenant. For example, an authorization can specify that access to a specific resource is to be given to members of a specific group.

Authorization can include role-based authorization (RBAC). In RBAC, a user can be assigned a specific role (e.g. the role of a user, the role of an administrator, and so forth), depending on one or multiple criteria. For example, one criterion can be group membership. For example, a user who is part of an administrator group (group of users who are administrators in the tenant) can be assigned a ROLE_ADMIN role. As another example, a user who is part of a user group can be assigned a ROLE_USER role. Different roles are associated with different privileges.

If a cloud system has just one tenant, then mapping the groups of the tenant to identity management classes (which correspond to respective roles) provided by the cloud system 100 can be relatively simple. An identity management class can refer to a class (provided by the identity management system of the cloud system) that is associated with a respective set of permissions with respect to access of the resources and/or services of the cloud system. As discussed further below, an identity management class can refer to a "system group" or to a role.

For a cloud system that has multiple tenants, the mapping of the groups of the different tenants to the identity management classes of the cloud system becomes more challenging. Different tenants can include different combinations of groups. For example, a first tenant may include an administrator group that should be granted an elevated set of privileges than members of a different group, such as a user group. On the other hand, a second tenant may specify that a group referred to as an administrator group should not be granted the elevated set of privileges, since the second tenant may include another super-administrator group that is the group that should be granted the elevated set of privileges. In this example, the administrator group of the first tenant should not be mapped to the same identity management class as the administrator group of the second tenant, as doing so may lead to privilege escalation for members of the administrator group of the second tenant. Privilege escalation refers to granting privileges to members of a particular group that are greater than what such members are entitled to.

In accordance with some implementations, as shown in FIG. 1, a cloud system 100 includes an identity management engine 102 that provides a mapping 104 of tenant groups (groups of various tenants 106) to identity management classes of the cloud system 100. The identity management engine 102 can use RBAC to specify an authorization schema for users, in which users are granted permissions based on roles assigned to the users. Each role is associated with a respective set of one or multiple privileges with respect to access of resources and/or services of the cloud system 100. Although not shown, the identity management engine 102 also maintains profile information for various users, such as users of the tenants 106.

Figure 2:
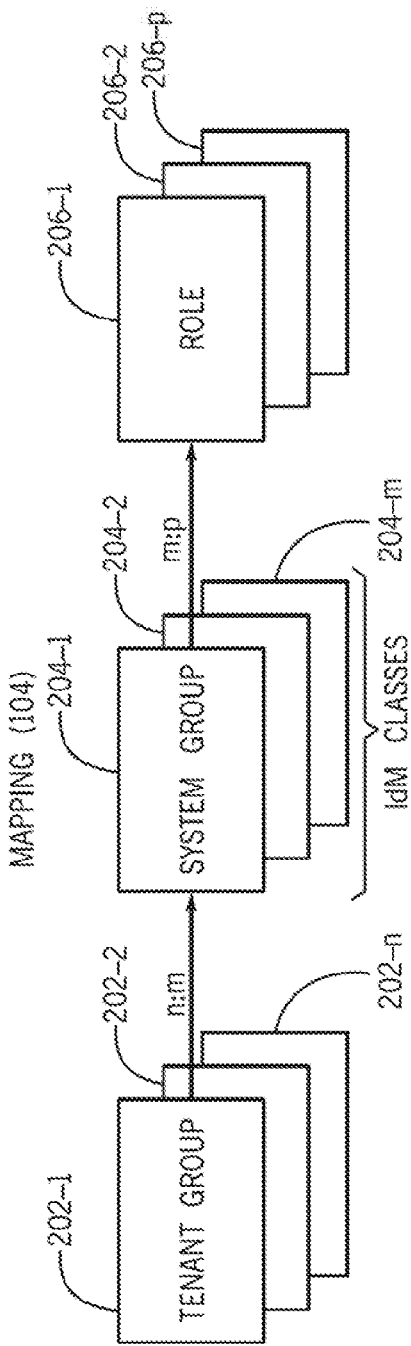
FIGS. 2 and 3 are schematic diagrams of mappings between tenant groups and identity management classes, according to various implementations.
Figure 3:
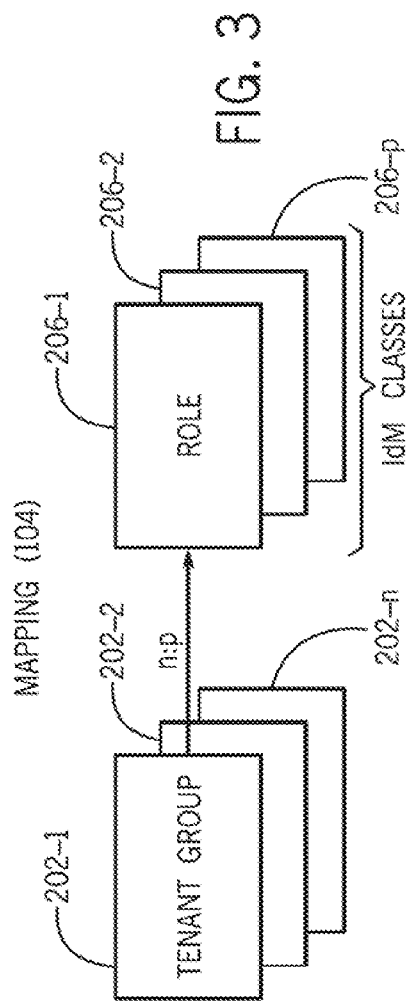

As discussed further in connection with FIGS. 2 and 3, the mapping 104 can map tenant groups to one of two different types of identity management classes. For example, FIG. 2 shows a mapping 104 between tenant groups and system groups, while FIG. 3 shows a mapping 104 between tenant groups and roles.

As further shown in FIG. 1, the cloud system 100 includes hierarchical delegation information 108 that specifies delegation rights among the identity management classes. A delegation right specifies a right of a member of a given identity management class to perform delegation with respect to a particular one of the identity management classes. Performing delegation with respect to a particular identity management class can include any one or some combination of the following: enrolling a new member in the particular identity management class, modifying information of a member in the particular identity management class, or removing a member from the identity management class. The hierarchical delegation information 108 describes the identity management class that a member has to be part of in order to perform delegation with respect to a particular identity management class.

The cloud system 100 includes a delegation engine 110 that is able to use the mapping 104 and the hierarchical delegation information 108 to determine whether or not a first member of a first of the identity management classes is allowed to perform delegation with respect to a second member in one of the identity management classes, in response to a request by the first member to perform the delegation with respect to the second member in one of the identity management classes. By using the hierarchical delegation information 108, the delegation engine 110 is able to prevent a tenant group from being translated into an identity management class with too high a privilege, which prevents privilege escalation.

Each of the engines (including 102 and 110, for example) of the cloud system 100 may be any combination of hardware and programming to implement the functionalities of the respective engine. Such combinations of hardware and programming may be implemented in a number of different ways. For example, the programming for an engine may include executable instructions stored on a non-transitory machine-readable storage medium and the hardware for the engine may include processor(s) to execute those instructions. In such examples, the machine-readable storage medium may store instructions that, when executed by the processor(s), implement functionalities of the engine. The machine-readable storage medium storing the instructions may be integrated in a computing device including the processing resource to execute the instructions, or the machine-readable storage medium may be separate but accessible to the computing device and the processing resource. The processing resource may include one processor or multiple processors included in a single computing device or distributed across multiple computing devices. In other examples, the functionalities of any of the engines may be implemented in the form of electronic circuitry.

The cloud system 100 also includes one or multiple applications 112 that manage access to cloud service(s) 114 and cloud resource(s) 116. The cloud service(s) 114 and cloud resource(s) can be accessed on demand by the tenants 106, by accessing the application(s) 112.

FIG. 2 illustrates an example of the mapping 104 of FIG. 1. In the example of FIG. 2, there are n tenant groups 202-1, 202-2, . . . , 202-$n$. The tenant groups correspond to the various groups of the tenants 106 shown in FIG. 1. The tenant groups 202-1 to 202-$n$ are mapped to various system groups 204-1, 204-2, . . . , 204-$m$. In the example of FIG. 2, the system groups 204-1, 204-2, . . . , 204-$m$ are the identity management classes noted above. In FIG. 2, the tenant groups are not mapped directly to the roles of the authorization schema used in the cloud system 100. Rather, the tenant groups are mapped to system groups that abstract the roles of the authorization schema of the cloud system 100. FIG. 2 further shows a mapping between the system groups 204-1 to 204-$m$ to various roles, including roles 206-1, 206-2, . . . , 206-$p$.

The mapping between the tenant groups and the system groups is an n:m mapping, which indicates that a specific tenant group can map to one or multiple system groups, and that a specific system group can map to one or multiple tenant groups. Similarly, the mapping between the system groups and the roles is an m:p mapping, which also indicates that a specific system group can map to one or multiple roles, and a specific role can map to one or multiple system groups.

The mapping between the tenant groups 202-1 to 202-$n$ to the system groups 204-1 to 204-$m$ can be managed by the identity management engine 102 of FIG. 1. The mapping between the system groups 204-1 to 204-$m$ and the roles 206-1 to 206-$p$ can be managed by the application 112 of the cloud system 100. Generally, the mapping between the tenant groups and the system groups can be a dynamic mapping, which can be dynamically changed by specific users of the tenants 106 or the cloud system 100. For example, users of a tenant that can modify the mapping 104 can be a tenant administrator. As another example, an administrator of the identity management engine 102 can modify the mapping 104.

The mapping between the system groups and the roles that is managed by the application 112 is a relatively static mapping, where changes occur less frequently. For example, the mapping between system groups and roles can change when the application 112 itself changes, such as when a new role is being introduced, a role is modified, or a role is deleted. A new role can be mapped to a new system group, or the new role can be mapped to an existing system group.

FIG. 3 illustrates the mapping 104 according to alternative implementations. In FIG. 3, the tenant groups 202-1, 202-2, . . . , 202-$n$ are mapped to respective roles 206-1, 206-2, . . . , 206-$p$. The mapping is an n:p mapping that allows a specific tenant group to be mapped to one or multiple roles, or that allows a specific role to be mapped to one or multiple tenant groups. In the mapping of FIG. 3, the roles 206-1 to 206-$p$ are the identity management classes.

In the example of FIG. 2 or 3, it is possible for a user to be assigned to multiple identity management classes. Note that the multiple identity management classes are delegated separately and independently, in some implementations. By performing the delegation of the multiple identity management classes separately and independently, the permissions associated with the multiple identity management classes are not combined to achieve a higher level of privilege, which would lead to privilege escalation.

In each of FIGS. 2 and 3, the roles of one application 112 are shown. Note that it is possible for the cloud system 100 to include multiple applications, where each application can be associated with a respective set of roles. For example, the set of roles associated with a first application can be different from the set of roles associated with a second application. In such examples, the mapping 104 can be modified to map tenant groups to the different sets of roles, either directly (such as shown in FIG. 3) or indirectly through system groups (such as shown in FIG. 2).

Figure 4:
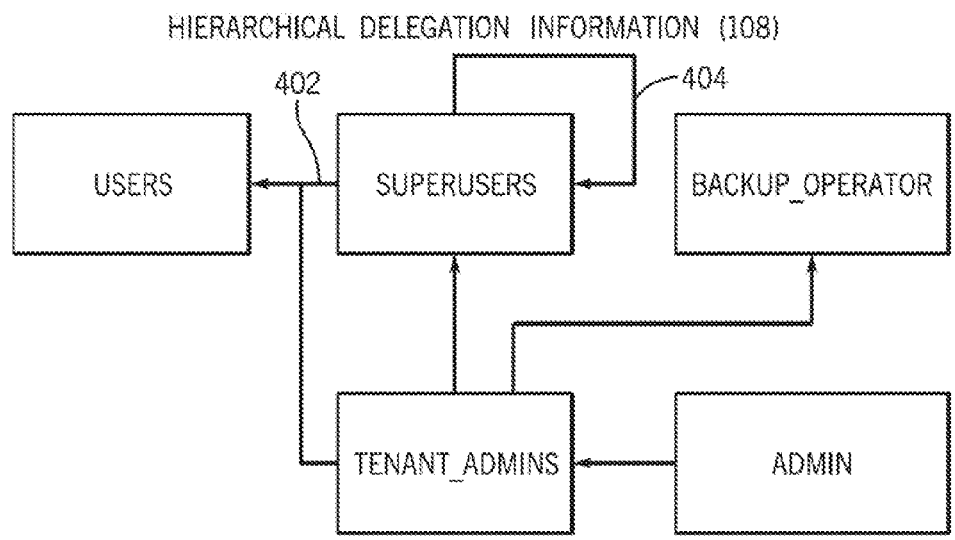
FIGS. 4 and 5 are schematic diagrams of hierarchical delegation information according to various implementations.

FIG. 4 shows an example of the hierarchical delegation information 108 of FIG. 1. The hierarchical delegation information 108 of FIG. 4 can be used with the mapping 104 of FIG. 2.

Various example system groups are depicted in FIG. 4, including a USERS system group, a SUPERUSERS system group, a TENANT_ADMINS system group, a BACKUP_OPERATOR system group, and an ADMIN system group. The arrows in FIG. 4 specify a delegation hierarchy among the different system groups. In the example of FIG. 4, as indicated by arrow 402, a member of the SUPERUSERS system group can perform delegation with respect to a member of the USERS system group. For example, a member of the SUPERUSERS system group can enroll a new member in the USERS system group. As another example, a member of the SUPERUSERS group can remove a member from the USERS system group. Another arrow 404 indicates that a member of the SUPERUSERS system group can perform delegation with respect to a member of the same SUPERUSERS system group.

The hierarchical delegation information 108 of FIG. 4 also indicates that a member of the TENANT_ADMINS system group can perform delegation with respect to a member of any of the USERS system group, the SUPERUSERS system group, or the BACKUP_OPERATOR system group. However, a member of the TENANT_ADMINS system group is unable to perform delegation with respect to a member of the TENANT_ADMINS system group. A member of the ADMIN system group, however, can perform delegation with respect to a member of the TENANT_ADMINS system group.

Figure 5:
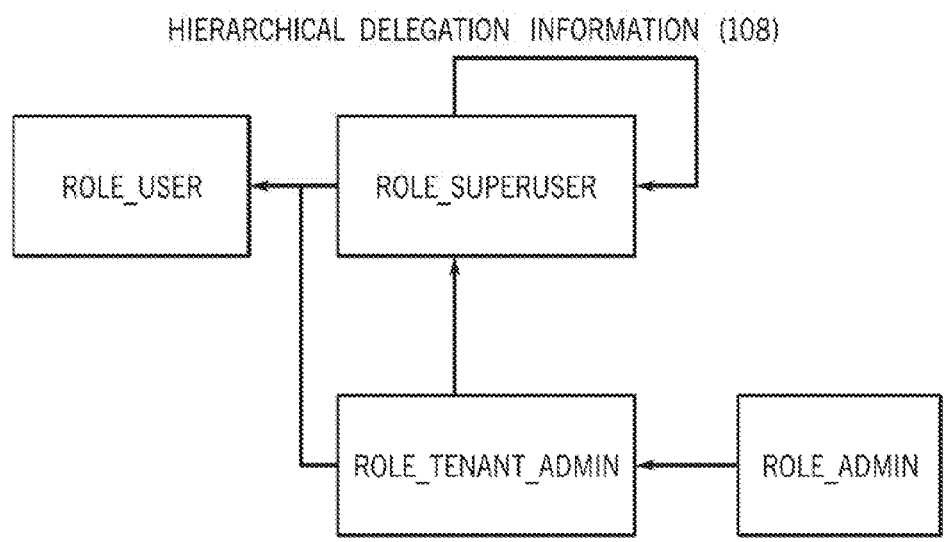

In alternative implementations, as shown in FIG. 5, the hierarchical delegation information 108 specifies a delegation hierarchy among different roles, including a ROLE_USER role, a ROLE_SUPERUSER role, a ROLE_TENANT_ADMIN role, and a ROLE_ADMIN role. The delegation hierarchy among different roles shown in FIG. 5 is interpreted in similar fashion as the delegation hierarchy amongst the different system groups of FIG. 4. For example, a member assigned the ROLE_SUPERUSER role can perform delegation with respect to a member assigned the ROLE_USER role.

In the example of FIG. 4, delegation cannot be performed with respect to the ADMIN system group. Similarly, in FIG. 5, delegation cannot be performed with respect to the ROLE_ADMIN role. In such examples, one or multiple specific administrators can be identified to allow for performance of delegation with respect to the ADMIN system group or ROLE_ADMIN role. In other examples, the hierarchical delegation information 108 can be modified to specify that a member of the ADMIN system group (FIG. 4) or a member assigned the ROLE_ADMIN role (FIG. 5) can perform delegation with respect to the ADMIN system group or ROLE_ADMIN role, respectively.

In some implementations, the hierarchical delegation information 108 can be part of the information that describes the respective identity management classes, such as the system groups or roles discussed above. In such examples, the information describing the identity management classes is extended with the hierarchical delegation information 108. In other examples, the hierarchical delegation information 108 can be separate from the information that describes the identity management classes.

Figure 6:
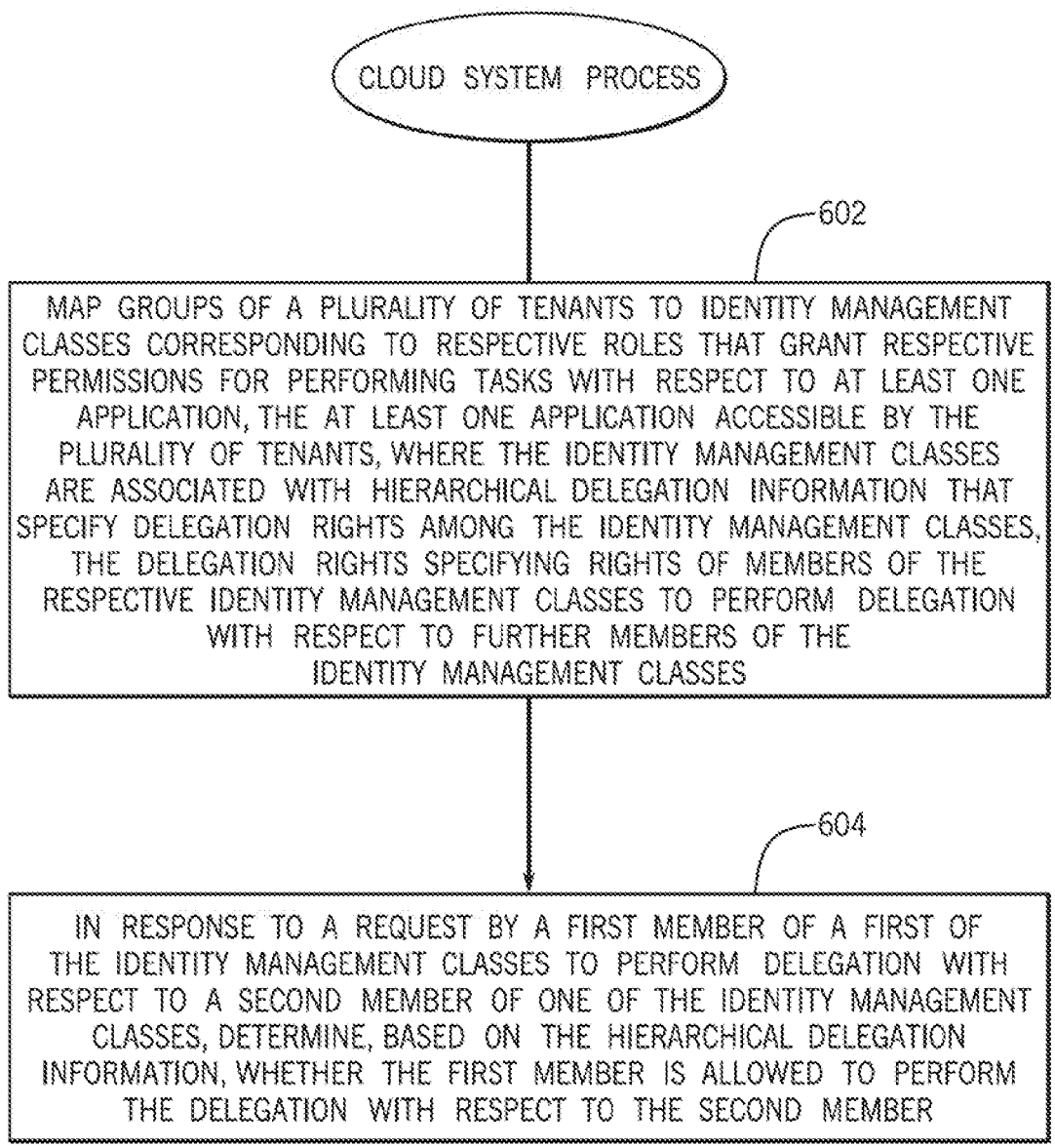
FIG. 6 is a flow diagram of a cloud system process, according to some implementations.

FIG. 6 is a flow diagram of a cloud system process according to some implementations. The cloud system process of FIG. 6 can be performed by entities of the cloud system 100, including the identity management engine 102 and delegation engine 110.

The identity management engine 102 maps (at 602), using the mapping 104 of FIG. 1, groups of multiple tenants 106 to identity management classes corresponding to respective roles that grant respective authorizations for performing tasks with respect to at least one application (e.g. application 112 in FIG. 1). The identity management classes can include the system groups of FIG. 2 or the roles of FIG. 3. The identity management classes are associated with hierarchical delegation information 108, such as according to the example of FIG. 4 or 5.

In response to a request by a first member of a first of the identity management classes to perform delegation with respect to a second member in one of the identity management classes, the delegation engine 110 determines (at 604), based on the hierarchical delegation information 108, whether the first member is allowed to perform the delegation with respect to the second member.

Figure 7:
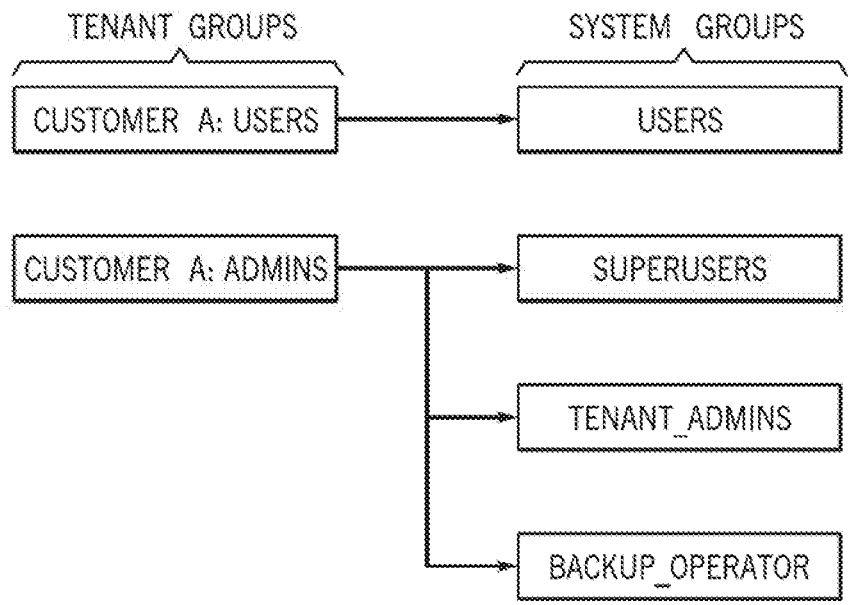
FIGS. 7-9 are schematic diagrams of example mappings between tenant groups and identity management classes, according to various implementations.

FIG. 7 illustrates an example mapping between tenant groups and system groups, in accordance with some implementations. Note that the system groups shown in FIG. 7 are part of the system groups depicted in the hierarchical delegation information 108 of FIG. 4. The tenant groups are groups of a particular tenant, referred to as "CUSTOMER A" in FIG. 7. The tenant groups of CUSTOMER A include a USERS tenant group and, an ADMINS tenant group. In the example of FIG. 7, the USERS tenant group is mapped to the USERS system group, while the ADMINS tenant group is mapped to each of the following system groups: SUPERUSERS, TENANT_ADMINS, and BACKUP_OPERATOR.

Based on the hierarchical delegation information 108 of FIG. 4, a member of the USERS tenant group cannot perform delegation with respect to a member of any of the system groups. However, a member of the USERS tenant group has all the privileges that come with the USERS system group.

According to the example of FIG. 7, by virtue of the fact that the ADMINS tenant group is mapped to the TENANT_ADMINS system group, a member of the ADMINS tenant group can perform delegation with respect to a member of any of the following system groups: SUPERUERS, BACKUP_OPERATOR, USERS. However, a member of the ADMINS tenant group is unable to perform delegation with respect to a member of the TENANT_ADMINS system group. A member of the ADMINS tenant group has all the privileges that come with the following system groups: SUPERUSERS, TENANT_ADMINS, and BACKUP_OPERATOR.

Figure 8:
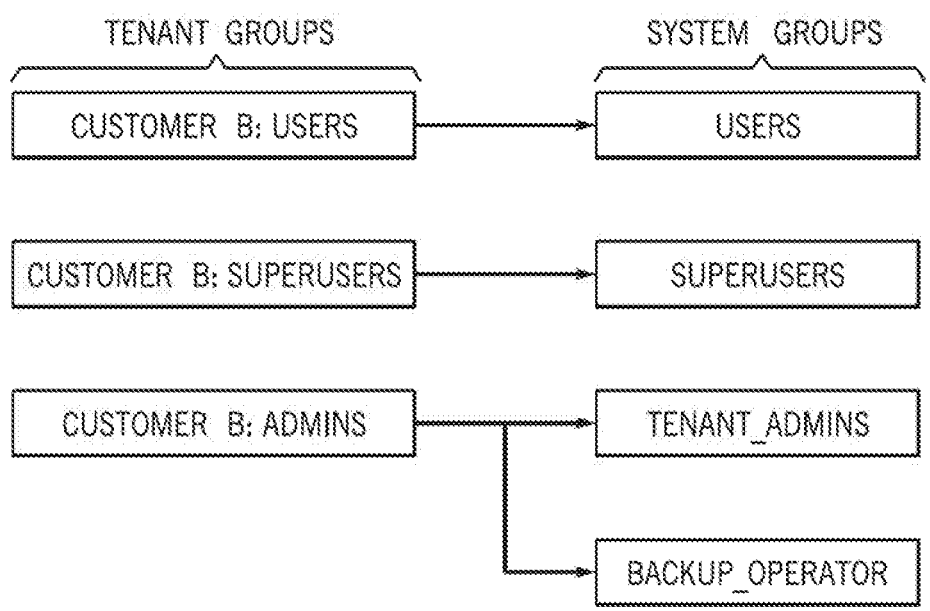

FIG. 8 shows an example mapping between tenant groups of another tenant (CUSTOMER B) and the system groups included in the hierarchical delegation information 108 of FIG. 4. In the example of FIG. 8, the tenant groups associated with CUSTOMER B include USERS, SUPERUSERS, and ADMINS. The USERS tenant group is mapped to the USERS system group. The SUPERUSERS tenant group is mapped to the SUPERUSERS system group. The ADMINS tenant group is mapped to the following system groups: TENANT_ADMINS and BACKUP_OPERATOR. Based on the hierarchical delegation information 108 of FIG. 4, a member of the USERS tenant group cannot perform delegation with respect to a member of any of the system groups depicted in FIG. 4. However, a member of the USERS tenant group has all privileges that come with the USERS system group. A member of the SUPERUSERS tenant group can perform delegation with respect to a member of the following system groups: SUPERUSERS and USERS. However, a member of the SUPERUSERS tenant group cannot perform delegation with respect to the following system groups: TENANT_ADMINS and BACKUP_OPERATOR. However, a member of the SUPERUSERS tenant group has all privileges that come with the SUPERUSERS system group.

In the FIG. 8 example, by virtue of the fact that the ADMINS tenant group is mapped to the TENANT_ADMINS system group, a member of the ADMINS tenant group can perform delegation with respect to the following system groups: SUPERUSERS, BACKUP_OPERATOR, and USERS. However, a member of the ADMINS tenant group cannot perform delegation with respect to a member of the TENANT_ADMINS system group. A member of the ADMINS tenant group has all privileges that come with the following system groups: TENANT_ADMINS and BACKUP_OPERATOR.

Figure 9:
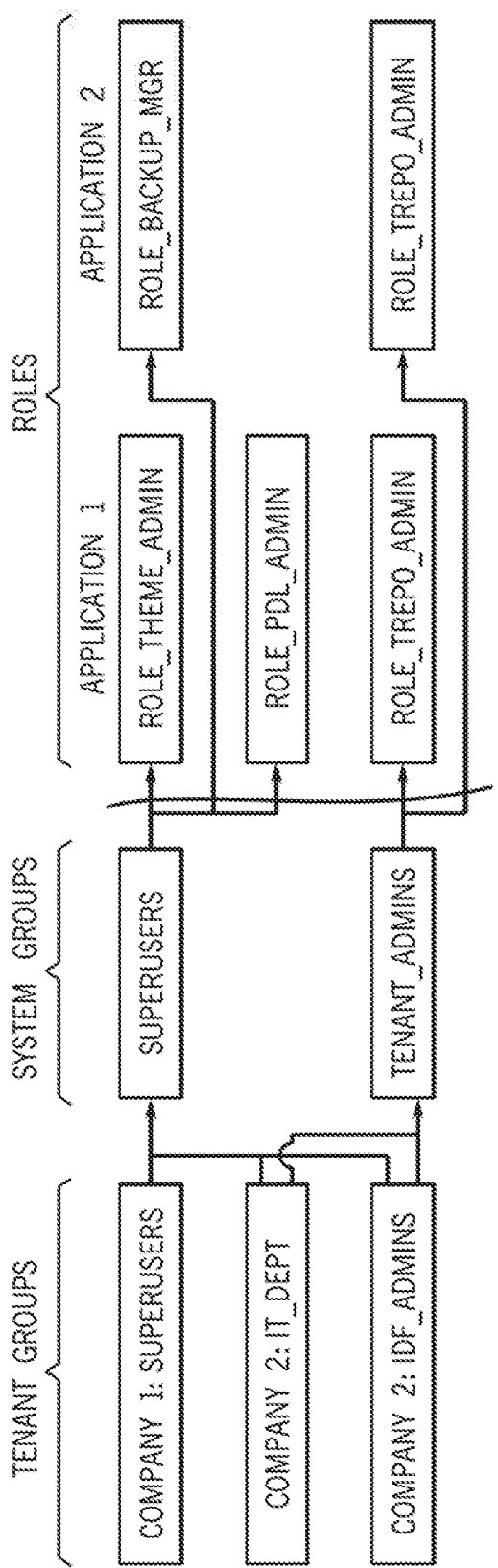

FIG. 9 shows an example mapping between tenant groups and system groups and between system groups and roles of multiple applications: APPLICATION 1 and APPLICATION 2. In the example of FIG. 9, it is assumed that the cloud system 100 has multiple applications, where each of the applications can be associated with a respective set of roles (which may be different from one another). The different roles associated with the different applications provide different permissions to respective users regarding access of resources associated with the different applications.

Two tenants are shown in the example of FIG. 9, including COMPANY 1 and COMPANY 2. In the example of FIG. 9, COMPANY 1 has one tenant group: SUPERUSERS. COMPANY 2 has two tenant groups: IT_DEPT and IDF_ADMINS.

The SUPERUSERS tenant group of COMPANY 1 is mapped to the SUPERUSERS system group. The IT_DEPT and IDF_ADMINS tenant groups of COMPANY 2 are both mapped to the SUPERUSERS system group. In addition, the IT_DEPT and IDF_ADMINS tenant groups of COMPANY 2 are also mapped to the TENANT_ADMINS system group.

The SUPERUSERS system group is mapped to the following roles of APPLICATION 1: ROLE_THEME_ADMINS and ROLE_PDL_ADMIN. In addition, the SUPERUSERS system group is mapped to the following role of APPLICATION 2: ROLE_BACKUP_MGR.

The TENANT_ADMINS system group is mapped to ROLE_TREPO_ADMIN of APPLICATION 1 and ROLE_TREPO_ADMIN of APPLICATION 2.

By employing techniques or mechanisms according to some implementations a hierarchical, restricted delegation that specifies delegation rights can be provided for a mapping between tenant groups and identity management classes. In accordance with some implementations, arbitrary tenant groups, which can be associated with multiple tenants, can be mapped to well-defined identity management classes that are related to permissions, while preventing a tenant group from being translated into an identity management class that is higher than what the tenant group is entitled to.

Figure 10:
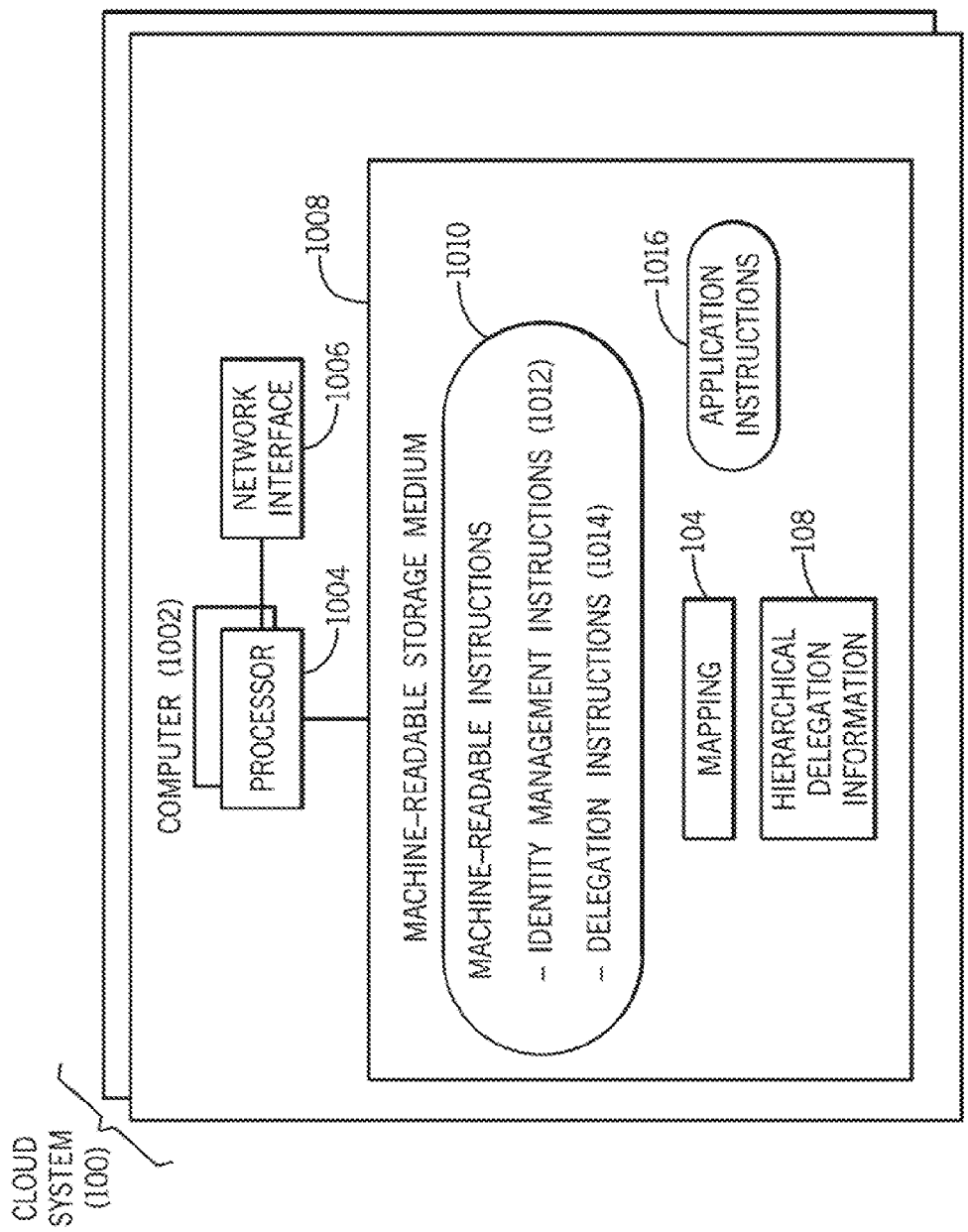
FIG. 10 is a block diagram of an example cloud system according to some implementations.

FIG. 10 is a block diagram of an example cloud system 100 that includes one or multiple computers 1002, according to some implementations. Each computer 1002 includes one or multiple processors 1004, which can be connected to a network interface 1006 to allow the computer 1002 to communicate over a data network.

The processor(s) 1004 can be coupled to a non-transitory machine-readable storage medium (or storage media) 1008, which can store instructions and other information. The instructions can include machine-readable instructions 1010, which can include identity management instructions 1012 (that are part of the identity management engine 102 of FIG. 1) and delegation instructions 1014 (that are part of the delegation engine 110 of FIG. 1). The machine-readable instructions 1010 are executable on the processor(s) 1004. A processor can include a microprocessor, microcontroller, processor module or subsystem, programmable integrated circuit, programmable gate array, or another control or computing device.

The storage medium (or storage media) 1008 can also store the mapping 104 and hierarchical delegation information 108 discussed above. In addition, the storage medium (or storage media) 1008 can also store application instructions 1016, which can correspond to the application(s) 112 depicted in FIG. 1.

As used herein, a "machine-readable storage medium" may be any electronic, magnetic, optical, or other physical storage apparatus to contain or store information such as executable instructions, data, and the like. For example, any machine-readable storage medium described herein may include any of various forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote, site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    mapping, by a system including a processor, groups of a plurality of tenants to identity management classes corresponding to respective roles that grant respective permissions for performing tasks with respect to at least one application, the at least one application accessible by the plurality of tenants, wherein the identity management classes are associated with hierarchical delegation information that specifies delegation rights among members of the identity management classes; and
    in response to a request by a first member of a first of the identity management classes to perform delegation with respect to a second member of one of the identity management classes, determining, by the system based on the delegation rights specified in the hierarchical delegation information for the first identity management class, whether the first member is allowed to perform the delegation with respect to the second member,
    wherein to perform the delegation with respect to the second member includes at least one of enrolling the second member in a particular identity management class, modifying information of the second member in the particular identity management class, and removing the second member from the particular identity management class, and
    wherein a first group and a second group of the groups of the plurality of tenants have a same role, but are mapped to different identity management classes having different delegation rights, wherein the delegation rights of each of the members of the identity management classes specify rights of each of the members of the identity management class to perform delegation with respect to further members of the identity management class.

2. The method of claim 1, wherein the request is a request by the first member of the first identity management class to enroll the second member in a second identity management class, and wherein the determining comprises determining, based on the hierarchical delegation information, whether the first member is allowed to enroll the second member in the second identity management class.

3. The method of claim 1, wherein the request is a request by the first member of the first identity management class to remove the second member from a second identity management class, and wherein the determining comprises determining, based on the hierarchical delegation information, whether the first member is allowed to remove the second member from the second identity management class.

4. The method of claim 1, wherein the request is a request by the first member of the first identity management class to modify information of the second member of a second identity management class, and wherein the determining comprises determining, based on the hierarchical delegation information, whether the first member is allowed to modify the information of the second member of the second identity management class.

5. The method of claim 1, wherein mapping the groups of the plurality of tenants to the identity management classes comprises mapping the groups of the plurality of tenants to system groups, the method further comprising:
    mapping, by the system, the system groups to the respective roles.

6. The method of claim 5, wherein mapping the groups of the plurality of tenants to the system groups is performed by an identity management engine, and wherein mapping the system groups to the roles is performed by the at least one application.

7. The method of claim 5, wherein the system groups are common to a plurality of applications that have different sets of roles.

8. The method of claim 1, wherein mapping the groups of the plurality of tenants to the identity management classes comprises mapping the groups of the plurality of tenants to the roles.

9. The method of claim 1, wherein the at least one application is a cloud-based application for providing one or a combination of cloud resources and cloud services to members of the plurality of tenants.

10. A cloud system comprising:
    at least one of a cloud resource and a cloud service accessible by a plurality of tenants of the cloud system; and
    at least one storage medium to store a mapping between groups of the plurality of tenants and identity management classes corresponding to respective roles that grant respective permissions to access the cloud resource or cloud service, wherein the identity management classes are associated with hierarchical delegation information that specifies delegation rights among members of the identity management classes; and at least one processor to:

receive a request by a first member of a first of the identity management classes to perform delegation with respect to a second member of a particular one of the identity management classes, wherein to perform the delegation with respect to the second member includes at least one of enrolling the second member in a particular identity management class, modifying information of the second member in the particular identity management class, or removing the second member from the identity management class; and in response to the request, determine, based on the hierarchical delegation information, whether the first member is allowed to perform the delegation with respect to the second member of the particular identity management class, wherein a first group and a second group of the groups of the plurality of tenants have a same role, but are mapped to different identity management classes having different delegation rights, wherein the delegation rights of each of the members of the identity management classes specify rights of each of the members of the identity management class to perform delegation with respect to further members of the identity management class.

11. The cloud system of claim 10, wherein the particular identity management class is the same as the first identity management class.

12. The cloud system of claim 10, wherein the particular identity management class is different from the first identity management class.

13. The cloud system of claim 10, wherein the mapping includes a first mapping between the groups of the plurality of tenants and system groups that correspond to the identity management classes, and a second mapping between the system groups and the roles.

14. An article comprising at least one non-transitory machine-readable storage medium storing instructions that upon execution by a cloud system cause the cloud system to:

store a mapping between groups of a plurality of tenants and identity management classes corresponding to respective roles that grant respective permissions for performing tasks with respect to at least one application, the at least one application accessible by the plurality of tenants and managing access of one or a combination of a cloud resource and a cloud service, wherein the identity management classes are associated with hierarchical delegation information that specifies delegation rights among members of the identity management classes; and in response to a request by a first member of a first of the identity management classes to perform delegation with respect to a second member of one of the identity management classes, determine, based on the hierarchical delegation information, whether the first member is allowed to perform the delegation with respect to the second member, wherein to perform the delegation with respect to the second member includes at least one of enrolling the second member in a particular identity management class, modifying information of the second member in the particular identity management class, and removing the second member from the identity management class, and wherein a first group and a second group of the groups of the plurality of tenants have a same role, but are mapped to different identity management classes having different delegation rights, wherein the delegation rights of each of the members of the identity management classes specify rights of each of the members of the identity management class to perform delegation with respect to further members of the identity management class.

15. The article of claim 14, wherein the hierarchical delegation information specifies delegation rights selected from among: a right of a member of one of the identity management classes to enroll a new member of one of the identity management classes, a right of a member of one of the identity management classes to modify information another member of one of the identity management classes, and a right of a member of one of the identity management classes to remove another member from one of the identity management classes.

* * * * *

UNITED STATES PATENT AND TRADEMARK OFFICE
CERTIFICATE OF CORRECTION

| | | |
|---|---|---|
| PATENT NO. | : 10,372,483 B2 | Page 1 of 1 |
| APPLICATION NO. | : 15/112371 | |
| DATED | : August 6, 2019 | |
| INVENTOR(S) | : Michael B Beiter et al. | |

It is certified that error appears in the above-identified patent and that said Letters Patent is hereby corrected as shown below:

On the Title Page

Item (54), and in the Specification, Column 1, Line 1, Title, delete "TENAT" and insert -- TENANT --, therefor.

Signed and Sealed this
Twenty-eighth Day of January, 2020

Andrei Iancu
*Director of the United States Patent and Trademark Office*